3,544,354
METHOD OF PREPARING A PHOSPHOR COMPOSITION FOR SCREENING A COLOR CATHODE-RAY TUBE
Irwin Kachel, Skokie, Ill., assignor to Zenith Radio Corporation, Chicago, Ill., a corporation of Delaware
No Drawing. Filed June 1, 1966, Ser. No. 554,367
Int. Cl. C09k 1/04; B44d 1/14
U.S. Cl. 117—33.5    4 Claims

ABSTRACT OF THE DISCLOSURE

Phosphor particles are suspended in a neutral liquid along with pigment particles that are very small relative to the phosphor. A basic solution including aluminum hydroxide and a salt solution including aluminum chloride are added to produce aluminum hydroxide as a reaction product. This is an inorganic insoluble gel formed in situ which coats the phosphor and pigment particles. The liquid is agitated, causing the pigment to coat the phosphor, and thereafter the pigmented phosphor is removed and heated to increase the adhesion of the pigment to the phosphor.

---

The present invention is directed to a novel method of preparing a phosphor composition to be used in the screening of a color cathode-ray tube. The invention has to do, more particularly, with preparing a phosphor composition which has, as ingredients, particles of phosphor that emit visible light when excited by impacting electrons and a filter material with filtering properties related to the emission of the phosphor as described in Pat. 3,114,065, issued to Sam H. Kaplan on Dec. 10, 1963, and as further particularized, as to red phosphor material, in a continuing application of Kaplan, which matured into Pat. 3,308,326, issued on Mar. 7, 1967. These related inventions are assigned to the same assignee as the present one.

In the current state of the art, there is a distinct trend to the use of rare earth phosphors, such as the europium activated vanadates, as the red component of the tri-color screen that is characteristic of the shadow mask type of color tube. The adoption of the rare earth phosphors has been prompted by the improved color and the increased brightness of the red field of a color image obtained with such phosphors compared with what had previously been attainable with manganese activated zinc phosphate or silver activated zinc cadmium sulphide phosphors. Prior to the above-identified disclosures of Kaplan, the red phosphors in commercial use were distinctly inferior to the blue and green phosphors both in the matter of color value and efficiency.

Kaplan has taught that certain of these well-known red phosphors, such as silver-activated zinc cadmium sulphide, may, indeed, be employed to attain color values and brightness levels that are at least equivalent to those of the rare earth phosphors without the great cost that is inherent in the use of rare earth materials. In particular, the Kaplan teaching as applied to a zinc cadmium sulphide phosphor is to select its cadmium content to provide a peak visible output at a wavelength of approximately 6350 angstroms which is the desired color of the red image. The efficiency of that phosphor is adequate to achieve the desired brightness level but its spectral emission is broad, including a tail portion which extends from the desired wavelength of 6350 angstroms into the shorter wavelength region and which causes the emitted light to be colorimetrically inferior to the rare earth phosphors. Kaplan further teaches that a filter ingredient be associated with the zinc cadmium sulphide to attenuate or eliminate the spectral output of the phosphor below the desired wavelength of 6350 angstroms in order to restore the color of the emitted light to its proper value. This improved phosphor, while utilizing the inexpensive zinc cadmium sulphide phosphor, achieves the correct colorimetric emission and its brightness level permits utilizing the full brightness capabilities of the blue and green phosphors used in the tri-color screen. Additionally, it imparts an albedo to the tri-color screen which significantly improves image and color contrast. There are other attributes of this screen combination including, inter alia, an improvement in processing time and a pleasing, distinctive appearance of the de-energized screen.

As described in the Kaplan disclosures, the red portion of the tri-color screen may be prepared with an intermixture of the red phosphor and an appropriate filter or pigment material deposited in the elemental screen areas that are devoted to producing the red field of a color image. The use of an intermixture, however, presents the possibility that the filter or pigment, having a small particle size compared to the phosphor and being free for movement relative thereto may contaminate the blue and/or green elemental phosphor areas during the screening which, of course, is undesirable. As recorded in the Kaplan continuing application, the pigment may be coated on the phosphor particles which greatly minimizes the possibility of cross contamination. The mechanics of coating phosphor particles are well known in the art and entail precipitating the coating material directly upon the phosphor particles. This is an acceptable approach to preparing the phosphor-filter combination disclosed by Kaplan but the present invention is a more easily practiced and attractive solution to the problem of preparing the red phosphor composition.

Accordingly, it is a principal object of the invention to provide a novel method of preparing a phosphor composition for use in screening a color cathode-ray tube which composition comprises particles of a phosphor that emit light of a predetermined wavelength coated with a pigment which is highly absorptive of light in the visible spectrum except for light of that particular wavelength.

It is a specific object of the invention to provide a method of preparing such a phosphor composition having particles of zinc cadmium sulphide phosphor overcoated with a pigment that is highly absorptive of those radiations characteristic of such a phosphor but having a wavelength shorter than the desired emission of approximately 6350 angstroms, and in which there are no unbonded or loose fine pigment particles.

The method of the invention concerns the preparation of a phosphor composition for use in screening a color cathode-ray tube having as ingredients particles of a phosphor which emit visible light in response to electron energization and a pigment which overcoats the phosphor particles and is highly absorptive of light in the visible spectrum except for light corresponding to a desired portion of the emission of the phosphor particles. Steps of the method comprise suspending a quantity of the phosphor particles and a quantity of particles of the pigment in a neutral liquid in which the phosphor particles and the pigment particles are insoluble. The pigment has a small particle size relative to the phosphor in order to accomplish effective coating of the phosphor. An adhesive coating is formed, in situ, on the phosphor particles and on the pigment particles while those particles remain in suspension in the neutral liquid. The liquid is agitated to cause particles of the pigment to bind to and coat particles of the phosphor while the series of particles are still in suspension. Finally, the pigment coated phosphor particles are removed from the supernatant liquid and dried.

In accordance with a particular aspect of the invention, the adhesive is of the inorganic gel type and the pigment coated phosphor particles, after removal from the supernatant liquid, are subjected to a heat treatment to accomplish dehydration of the gel in order to increase the adhesive strength of the binder.

The features of the present invention which are believed to be novel are set forth with particularity in the appended claims. The organization and sequence of performance of the steps of the inventive method, together with further objects and advantages thereof, may best be understood by reference to the following detailed description.

A phosphor composition, having as ingredients particles of phosphor which emit light of a particular color and particles of a pigment or filter with absorptive properties correlated with respect to the emission band of the phosphor, is suitable for use as any of the three colors of a tri-color tube although experience to date has demonstrated that the phosphor-pigment combination contributes most pronouncedly to the red and blue components of the tri-color screen. For the most part, the invention may be practiced in essentially the same way in coating any of the three color phosphors subject to the precaution that the adhesive not adversely affect the color response of the screen. For example, ferric hydroxide is a known form of gel that may readily be formed in situ but it has a red cast and is subject to less general use in the process under consideration than a clear adhesive such as aluminum hydroxide or any other clear basic or acid gel.

In practicing the invention, a quantity of phosphor particles and a related quantity of particles of an appropriate pigment are suspended in a neutral liquid, that is to say, a liquid that does not react chemically with either the phosphor or the pigment. Moreover, the liquid chosen is one in which neither the phosphor nor the pigment is soluble. Deionized water is generally acceptable. The pigment must have a smaller particle size than the phosphor. Usually, commercially available phosphors have an average particle size in the neighborhood of 5 to 15 microns and the pigment particle size is preferably less than one micron.

While the phosphor and pigment particles are in suspension in the neutral liquid, an adhesive coating is formed in situ on the phosphor and pigment particles. The adhesive coating and the materials from which it is formed present a wide field of choice inasmuch as the coating may be organic or inorganic. The only necessary restriction on the coating is that it must not adversely affect the response of a tri-color screen including the pigmented phosphor and it must be able to withstand and be compatible with the processing of the screen, performing its function of binding the pigment to the phosphor throughout the necessary screening and tube processing steps. More particularly, the binder must not adversely affect brightness or emission efficiency and it must not impair the colorimetric properties of the phosphor to which it is applied or the tri-color screen of which the coated phosphor is one component. Generally, the adhesive must not be water soluble because screening is frequently accomplished with the use of water soluble resists as an ingredient for a slurry which also includes the coated phosphor. In any such environment, if the adhesive is water soluble, the adhesive coating would deteriorate and the pigment lose its adhesion to the phosphor in the presence of the water contained in the slurry or the water used in processing the slurry.

The process step of forming an adhesive coating in situ, while the particles to be coated are suspended in a neutral liquid, may readily be accomplished by the admixture of a strongly basic solution and a salt solution which contains an anion capable of reacting with the basic solution to form an inorganic gel. The base solution may include ammonium hydroxide and may be admixed with aluminum chloride to produce as a reaction product aluminum hydroxide which is a known gel. As suggested above, ferric hydroxide formed by reacting ferric chloride is another adhesive gel but this is useful only in coating red phosphor particles because of its color contribution. Silica gel is another form of inorganic adhesive that may readily be formed by a reaction involving organic and inorganic salts which contain the silicate radical in their composition. For example, acids (phosphoric or boric) may react with sodium or potassium silicate to form an acid gel by precipitation. Such a gel may, likewise, be precipitated by the use of alcohol or concentrates of ammonia reacting with sodium or potassium silicate. These several illustrations are suitable for forming an inorganic and insoluble gel in situ as an adhesive coating for the particles of phosphor and pigment that are suspended in the neutral liquid.

It is not necessary that the adhesive be inorganic; it is just as feasible to employ an organic adhesive although the precautions with respect to insolubility or compatibility to the tube processing and colorimetry of the screen must still be observed. For example, one may employ a water insoluble resinous binder such as a methacrylate, nitrocellulose, or polyvinyl carbazole polymer. In utilizing this approach, a solution of the resinous binder is prepared and introduced into the suspension of the phosphor and pigment particles and the resin is then taken out of solution to form the desired adhesive coating, for example, by precipitation or by evaporating the solvent. Alternatively, the phosphor and pigment particles may be suspended in a dilute solution of nitrocellulose in acetone to which water is added to precipitate the nitrocellulose out of solution. In this fashion, an organic binder is formed in situ and applied as a coating to the phosphor and pigment particles.

The suspension of phosphor and pigment particles is agitated, either while the adhesive coating is being formed or subsequently, to cause the particles of the pigment to bind to and coat the phosphor while these components remain in suspension in the neutral liquid. Thereafter, the pigment coated phosphor particles are removed from the supernatant liquid by filtering, decanting, or otherwise and are dried. The phosphor coated particles are now ready to be used in the usual way in screening a color cathode-ray tube.

An illustrative formulation for practicing the invention by reacting a strongly basic solution and a salt solution to coat the phosphor and pigment particles is as follows:

There is placed in a first beaker 100 cc. of deionized water at the boiling temperature and two drops of a non-anionic wetting agent (such as type 9N9, supplied by Du Pont) is added. There is further added 5 cc. of a 1:1 solution of ammonium hydroxide in water. Finally, 25 grams of the phosphor to be coated are added. (In the case of red phosphor, this may be commercially available type RS–370 supplied by U.S. Radium.) This mixture is stirred rapidly for approximately 10 minutes.

In a second beaker a pigment is dispersed in ethyl alcohol. Specifically, to 100 cc. of ethyl alcohol there is added one gram of the pigment. The type of pigment is determined by the filtering that is required and the amount is determined by the percent of concentration. Usually, the pigment is 10 percent or less in weight of the phosphor particles. (For coating 25 grams of U.S. Radium 370 red phosphor 4 percent or one gram of cadmium red pigment, cadmium sulpho-selenide, such as #4815 supplied by General Color Company is used.) This mixture is stirred for 20 minutes in room temperature.

A quantity of aluminum chloride, 0.20 gram for the illustration under consideration, is dissolved in 10 cc. of distilled water and mixed for five minutes. Then it is added to the pigment dispersion which is stirred for another five minutes.

The dispersion of the pigment in ethyl alcohol is now added to the dispersion of the phosphor and they are mixed by rapid stirring for approximately one-half hour. The interaction of the ammonium hydroxide and the aluminum chloride produces a basic gel, aluminum hydroxide, which coats both the phosphor particles and the pigment particles. The coated phosphor particles are filtered out from the supernatant liquid and dried after which they are baked at approximately 400° C. for 20 minutes. This heat treatment breaks the aluminum hydroxide down into aluminum oxide, which is a very strong binder, and water. This heat treatment increases the adhesion of the filter to the phosphor particles and the phosphor composition is now ready for use in screening. Of course, since all of the particles are coated with an adhesive in the described process, the particles of phosphor may adhere to one another and tend to agglomerate. It is desirable to break up any such agglomeration by running the phosphor composition through a 165 mesh sieve to arrive at the final phosphor composition.

As described, it is convenient to arrange initially to have separate dispersions of phosphor in water and pigment in ethyl alcohol because this facilitates optimizing the components from which the pigment coated phosphors are derived. It will be understood, however, that this is not a limitation on the inventive process. If desired, the particles of phosphor and pigment may be placed initially in a common liquid to which the reacting component is added in developing the adhesive gel.

Silica gel may be utilized as a binder for cementing pigment particles to the phosphor that is to be coated in accordance with the following illustrative formulation:

In a first beaker 25 grams of the phosphor are suspended in 100 cc. of water and 10 cc. of concentrated ammonium hydroxide is added to the suspension and agitated vigorously. In a second vessel the pigment is dispersed in 150 cc. of ethyl alcohol. Then 5 cc. of potassium silicate, diluted in 50 cc. of water, is added to the suspension of phosphor and mixed for 5 minutes. While this mixing takes place, the pigment dispersion is also introduced into the first beaker and the fine pigment particles become cemented to the particles of phosphor by means of a silica gel developed in situ as a result of the interaction of the ammonium hydroxide and potassium silicate. The coated phosphor particles are separated by filtering and, after drying, are baked.

When inorganic gels are employed as the adhesive to affix the pigment to the phosphor particles, the binder remains as a constituent part of the phosphor in the finished tube whereas organic resins used as binders burn out during the baking process of the tube. However, the organic binders will have served their purpose of holding the pigment particles immobile and, therefore, preventing cross contamination during the screening process so that after the screen has been properly formed, there is no further requirement for the binder and its removal has no adverse effect.

The described process differs from previous procedures of the art for coating phosphors in that the coating pigment material is not precipitated onto the phosphor particle. In the described process, the pigment particles are essentially bound mechanically to the phosphor particles. This binding performs the necessary function of preventing cross contamination of the fine pigment particles into the other components of the tri-color screen. At the same time no chemical reaction involving the phosphor or pigments takes place which avoids impairing the color values or efficiency of the resulting composition.

While particular embodiments of the invention have been described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:
1. The method of preparing a phosphor composition for use in screening a color cathode-ray tube having as ingredients particles of a phosphor which emit visible light of a predetermined wavelength coated with a pigment which is highly absorptive of light in the visible spectrum except light of said predetermined wavelength, which method comprises the following steps:
   suspending a quantity of said phosphor particles and a quantity of particles of said pigment in a neutral liquid in which said phosphor particles and said pigment particles are insoluble, said pigment particles being small relative to said phosphor particles;
   forming in situ on said phosphor particles and on said pigment particles, while said particles remain in suspension in said liquid, an adhesive inorganic gel coating that is insoluble in said liquid;
   agitating said liquid to cause particles of the gel-coated pigment to bind to and coat particles of the gel-coated phosphor while still in suspension in said liquid; and
   removing the pigment-coated phosphor particles from the supernatant liquid and heating them to dehydrate said gel coating and increase the adhesion of said pigment particles to said phosphor particles.
2. The method of preparing a phosphor composition in accordance with claim 1 in which the concentration of pigment particles in terms of weight is less than 10 percent of the phosphor particles.
3. The method of preparing a phosphor composition in accordance with claim 1 in which the pigment coated phosphor particles, after separation from the supernatant liquid, are baked at approximately 400° C.
4. The method of preparing a phosphor in accordance with claim 1 in which said gel coating is formed by adding to said neutral liquid, having said phosphor and pigment particles in suspension, a basic solution and a salt solution containing an anion capable of reacting with said basic solution.

References Cited

UNITED STATES PATENTS

| 2,817,599 | 12/1957 | Edwards et al. | 117—100 X |
| 2,903,377 | 9/1959 | Saulnier | 117—33.5 |
| 2,996,380 | 8/1961 | Evans | 117—33.5 |
| 3,017,288 | 1/1962 | Windsor | 117—33.5 |
| 3,275,466 | 9/1962 | Kell | 117—100 X |
| 3,397,950 | 8/1968 | Schnurch | 117—33.5 |
| 3,308,326 | 3/1967 | Kaplan | 117—33.5 X |

WILLIAM D. MARTIN, Primary Examiner

M. R. P. PERRONE, Jr., Assistant Examiner

U.S. Cl. X.R.

117—100